No. 878,333. PATENTED FEB. 4, 1908.
H. BONN, Jr.
CLARINET.
APPLICATION FILED MAR. 23, 1904.
3 SHEETS—SHEET 1.
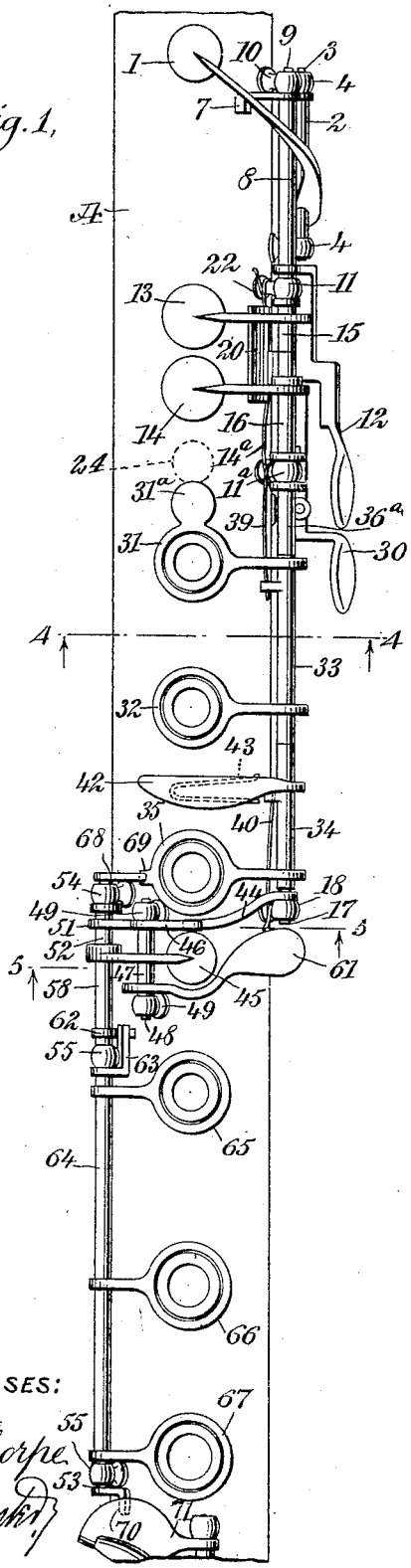
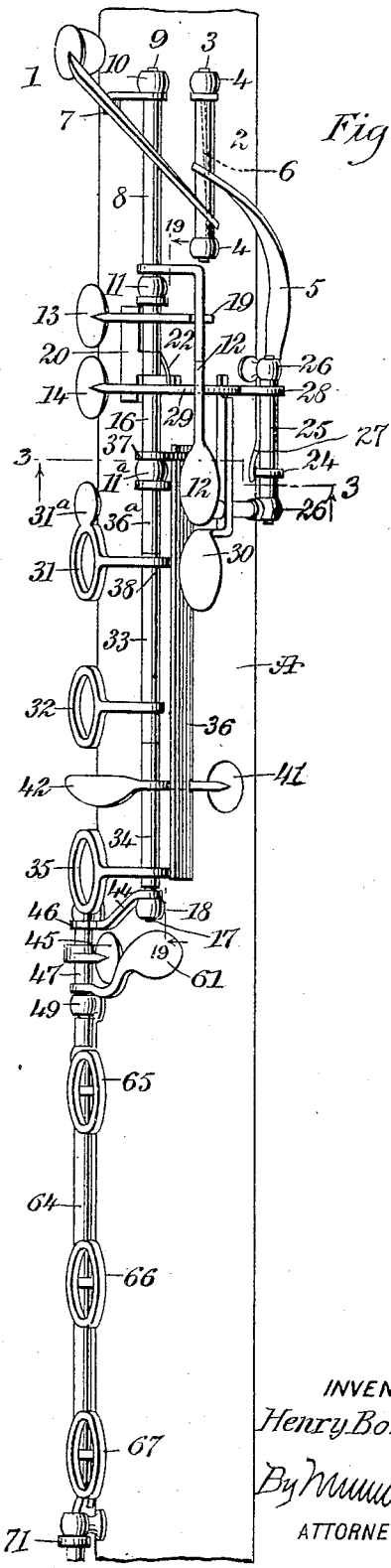
WITNESSES:
Edw. Thorpe
INVENTOR
Henry Bonn Jr.
By
ATTORNEYS No. 878,333. PATENTED FEB. 4, 1908.
H. BONN, Jr.
CLARINET.
APPLICATION FILED MAR. 23, 1904.
3 SHEETS—SHEET 2.
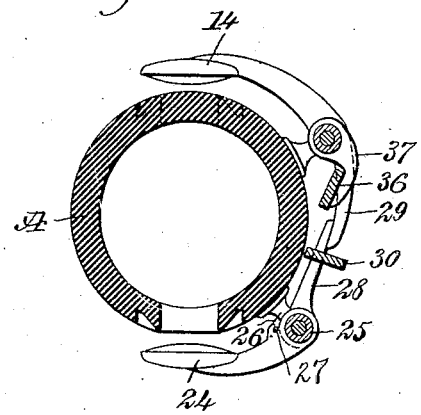
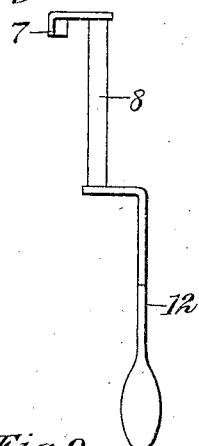
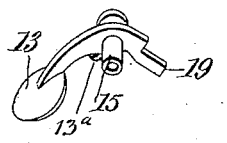
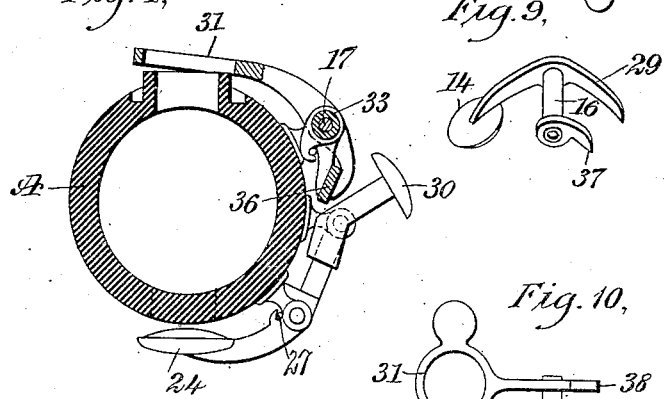
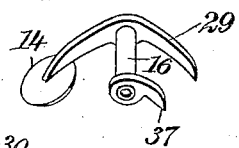
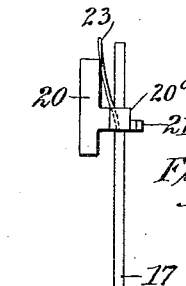
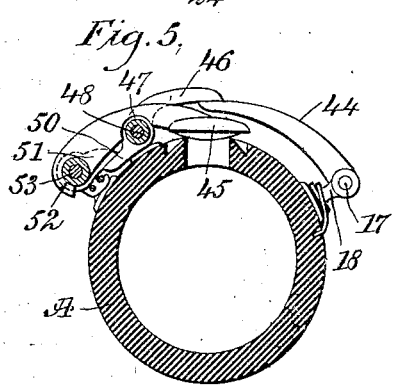
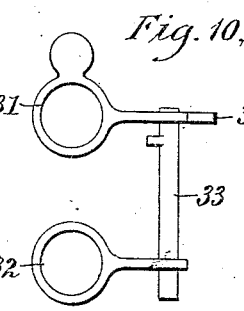
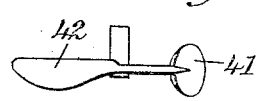
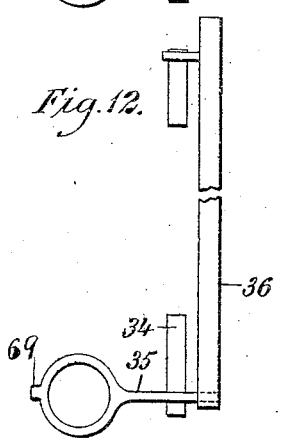
WITNESSES:
Edward Thorpe
[signature]
INVENTOR
Henry Bonn Jr.
BY
[signature]
ATTORNEYS No. 878,333.

PATENTED FEB. 4, 1908.

H. BONN, JR.
CLARINET.
APPLICATION FILED MAR. 23, 1904.

3 SHEETS—SHEET 3.

WITNESSES:
Edward Thorpe
Rev. J. Hooker

INVENTOR
Henry Bonn Jr.
BY
ATTORNEYS

THE NORRIS PETERS CO., WASHINGTON, D. C.

UNITED STATES PATENT OFFICE.

HENRY BONN, JR., OF SCRANTON, PENNSYLVANIA.

CLARINET.

No. 878,333.　　Specification of Letters Patent.　　Patented Feb. 4, 1908.

Application filed March 23, 1904. Serial No. 199,533.

*To all whom it may concern:*

Be it known that I, HENRY BONN, Jr., a citizen of the United States, and a resident of Scranton, in the county of Lackawanna and State of Pennsylvania, have invented a new and Improved Clarinet, of which the following is a full, clear, and exact description.

The invention relates to musical instruments, and its object is to provide a new and improved clarinet arranged to enable the musician to easily manipulate the key mechanism for correctly rendering certain tones and trills.

The invention consists of novel features and parts and combinations of the same, as will be more fully described hereinafter and then pointed out in the claims.

A practical embodiment of the invention is represented in the accompanying drawings forming a part of this specification, in which similar characters of reference indicate corresponding parts in all the views.

Figure 13:
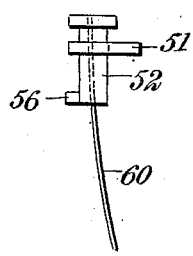
Figure 15:
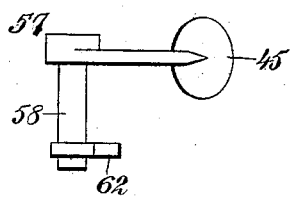
Figure 14:
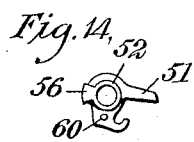
Figure 16:
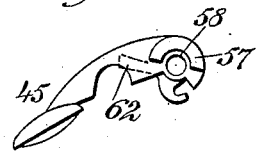
Figure 18:
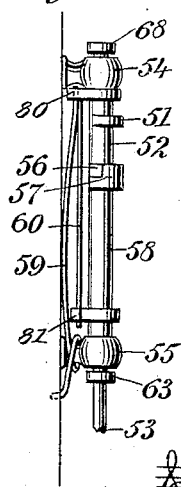
Figure 17:
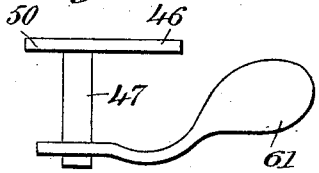
Figure 19:
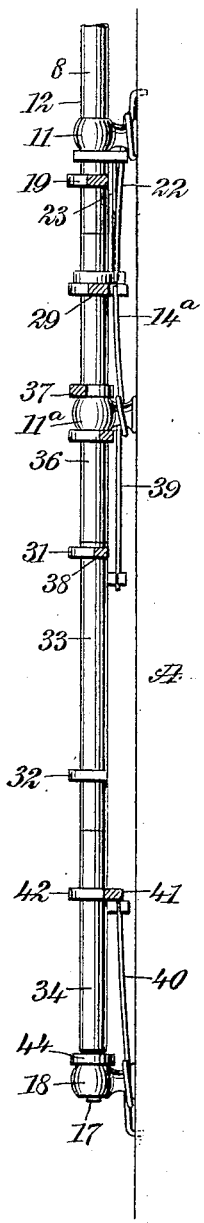
Figure 20:
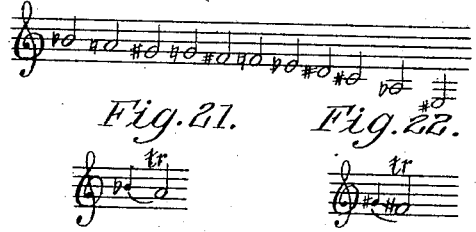
Figure 21:
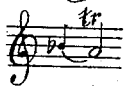
Figure 22:
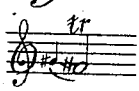

Figure 1 is a front elevation of the improvement; Fig. 2 is a side elevation of the same; Fig. 3 is an inverted sectional plan view of the same, on the line 3—3 of Fig. 2; Fig. 4 is a like view of the same, on the line 4—4 of Fig. 1; Fig. 5 is a similar view of the same, on the line 5—5 of Fig. 1; Fig. 6 is a plan view of the controlling lever for operating the key B-flat; Fig. 7 is a perspective view of the A-key; Fig. 8 is a plan view of the spindle and its arms for operating the A-key and the G-sharp key; Fig. 9 is a perspective view of the G-sharp key; Fig. 10 is a plan view of the first and second rings and their sleeves; Fig. 11 is a plan view of the E-flat key; Fig. 12 is a plan view of the third ring and connected parts; Fig. 13 is a plan view of the separate sleeve normally locked to the C-sharp key; Fig. 14 is an end view of the same; Fig. 15 is a plan view of the C-sharp key; Fig. 16 is a view of the upper end of the said C-sharp key; Fig. 17 is a plan view of the finger-piece for the C-sharp key; Fig. 18 is a side elevation of the mechanism for the C-sharp key; Fig. 19 is a longitudinal sectional elevation of the improvement, on the line 19—19 of Fig. 2. Fig. 20 represents a line of musical notation indicating the tones of the first register that are referred to in the description; Figs. 21 and 22 represent musical notations indicating trills.

The tubular body A of the clarinet is provided near its upper end with a B-flat key 1, normally closed and having its sleeve or hub 2 fulcrumed on a pivot 3, extending lengthwise of the body A and carried on posts 4 attached to the said body A. From the sleeve 2 extends to the rear of the body A and somewhat downwardly a finger-piece 5, adapted to be pressed by the thumb of the left hand, to open the said B-flat key 1, held normally closed by a spring 6 (see Fig. 2). The under side of the key 1 is engaged by an arm 7, projecting from the upper end of a sleeve 8, having its pivot 9 carried by bearings 10 and 11, secured to the body A, the sleeve 8 standing parallel to the sleeve 2 and to one side thereof, as plainly indicated in Fig. 2. On the sleeve 8 is secured a finger-piece 12, adapted to be pressed by the forefinger of the left hand, for trilling the B-flat key 1 whenever it is desired to do so, it being understood that the said finger-piece 12, sleeve 8 and arm 7 form the trilling lever for the B-flat key 1.

Next below the B-flat key 1 is an A-key 13, and below this is arranged a G-sharp key 14, both keys having their sleeves 15 and 16 respectively mounted to swing loosely on the upper end of a spindle 17, the upper end of which is journaled in the bearing 11, while the lower end of the said spindle is journaled on a bearing 18. The A-key 13 is provided with a lateral arm 19, extending under the finger-piece 12 of the trilling lever for the B-flat key 1, so that when the finger-piece 12 is pressed the A-key 13 may be opened, as hereinafter more fully described, it being however understood that the A-key 13 and the G-sharp key 14 are normally open. For the purpose mentioned, the following arrangement is made: On the spindle 17 is secured the hub $20^a$ of a lengthwise extending bar 20, reaching under both keys 13 and 14, and on the said hub $20^a$ is arranged a lug 21, pressed on by the free end of a spring 22 attached to the bearing 11, the said spring 22 serving to normally hold the bar 20 in an uppermost position and thus the A-key 13 normally in an open position. On the hub $20^a$ of the bar 20 is secured a spring 23 which extends under the bar 20 and engages and presses a lug $13^a$ on the under side of the hub for the A-key 13 (see Figs. 7 and 8), to press or hold the same to the bar 20. The G-sharp key 14 is pressed on and held normally open by a spring 14ª, attached to the bearing 11ª. By the arrangement described, the G-sharp key 14, when pressed or closed, carries the bar 20 along, which in turn carries the A-key 13 with it, for closing the said A-key 13 and when the spindle 17 is turned by arm 44 hereinafter described the G-sharp key 14 remains in an open position, owing to the action of its spring 14ª, but the bar 20 is swung inward and carries along the A-key 13 for the latter to move into a closed position.

On the rear of the body A is arranged a key 24, normally open, but adapted to close the thumb-hole of the left hand, heretofore closed in other clarinets by the left hand thumb. This thumb-hole key 24 has its sleeve 25 journaled on bearings 26 attached to the body A, and the said key 24 is pressed on by a spring 27, for normally holding the key 24 in an open position. On the sleeve 25 is secured a laterally extending arm 28, extending under an arm 29 forming part of the G-sharp key 14 (see Fig. 3), so that when the thumb-hole key 24 is pressed by the musician, then the arm 28 imparts a swinging motion to the arm 29, to cause the G-sharp key 14 to move into a closed position, and when the G-sharp key 14 swings into a closed position, it carries the bar 20 along and with it the A-key 13, for the latter to move into a closed position at the time the keys 24 and 14 are closed, that is, on pressing the key 24 into a closed position, both the A-key 13 and the G-sharp key 14 are closed. It is understood that when the thumb hole key 24 is open and with it the keys 13 and 14, then the tone A is sounded, and when the thumb hole key 24 is closed and with it the keys 13 and 14, then the tone F-sharp is sounded.

Under the arm 28 of the thumb-hole key 24 extends the free end of a trill key 30, having its finger-piece immediately below the finger-piece 12, so as to be within convenient reach of the left forefinger of the player. Now when this trill key 30 is pressed, it swings the arm 28 and with it the arm 29 upward, so that the keys 24, 14 and 13 are simultaneously closed. When the key 30 is released, then the springs 14ª, 22 and 27 return the keys 24, 14 and 13 to their normal open positions.

The first and second rings 31 and 32 for the fore and middle fingers of the left hand have a common sleeve 33, mounted to turn loosely on the spindle 17, and the sleeve 34 for the third ring 35, to be played by the third finger of the left hand, is also loosely mounted on the said spindle 17. On the first ring 31 is a valve 31ª, for closing a hole in the body A when the ring 31 is pressed down. On the third ring 35 is secured a bar 36, extending upwardly under a lug 37 (see Figs. 9 and 12), on the sleeve 16 for the G-sharp key 14. Now when the third ring 35 is pressed, then the bar 36 imparts a swinging motion to the arm 37, to move the G-sharp key 14 into a closed position, and this key 14, moving into its closed position, carries the bar 20 along, closing the A-key at the same time that the G-sharp key 14 is closed.

On the sleeve 33 for the first and second rings 31 and 32 is secured an arm 38, engaging the under side of the bar 36, so that when either of the rings 31 or 32 is pressed, the arm 38 acts on the bar 36, to swing the G-sharp key 14 and the A-key 13 into a closed position, the same as if the ring 35 had been pressed, as above described.

The rings 31 and 32 are normally held in an open position by a spring 39, and a spring 40 holds the ring 35 normally in an open position. The bar 36, attached to the sleeve 34 of the ring 35, is provided near its upper end with a sleeve 36ª, loosely engaging the spindle 17 at a supplementary bearing 11ª for the spindle 17.

The E-flat key 41 is loosely fulcrumed on the spindle 17, and has its finger-piece 42 extending between the rings 32 and 35, as plainly indicated in the drawings, and the said key is pressed on by a spring 43, to normally hold the key 41 in a closed position. The valve-stem of the valve of the key 41 extends under the bar 36, so that when the finger-piece 42 of the key 41 is pressed and the latter is moved into an open position, then the bar 36 is actuated, to move the ring 35 and the G-sharp key 14 and the A-key 13 into a closed position, that is, while the E-flat key 41 is open, the G-sharp key 14 and the A-key 13 are closed.

On the lower end of the spindle 17 is secured an arm 44 which when pressed on closing the C-sharp key 45, as hereinafter explained, causes a turning of the spindle 17, to swing the bar 20 inward toward the body A, and close the A-key 13, held to the bar 20 by the spring 23, and above explained. The arm 44 extends under an arm 46, projecting from a sleeve 47 journaled on a pivot 48 carried by bearings 49 attached to the body A. The sleeve 47 is provided with a lug 50 (see Fig. 5), extending under a lug 51 rigid on a sleeve 52, mounted to turn loosely on a spindle 53 carried by bearings 54 and 55. On the sleeve 52 is formed a lug 56, abutting on a lug or shoulder 57 formed on a sleeve 58 to which the C-sharp key 45 is secured and, which sleeve 58 is also mounted to turn loosely on the spindle 53. A spring 59, held on the bearing 55, presses the sleeve 52, and a spring 60, secured on a lug 80 attached to the sleeve 52, presses a lug 81 secured to the sleeve 58, to hold the sleeve 52 to the sleeve 58, so that the C-sharp key 45 is normally held in a closed position by the spring 60 exerting pressure on the sleeve 58. On the sleeve 47 is secured a finger-piece 61, which when pressed by the musician, imparts a swinging motion to the sleeve 47, so that the lug 50, acting on the lug 51, turns the sleeve 52, with the sleeve 58 held to it by the spring 60 to swing the C-sharp key into an open position. The C-sharp key 45 gives G-sharp when the B-flat key 1 is pressed. By the arrangement described, a compound lever device is produced, which permits the use of a heavy spring 59 to keep the C-sharp key 45 closed, and yet the player can easily open the key by the slightest pressure on the finger-piece 61, and hence this compound lever arrangement facilitates the manipulation of the key 45, especially when playing rapid passages. When the finger-piece 61 is pressed as described and the C-sharp key 45 opens, then at the same time the arm 46 presses the arm 44, to impart a turning motion to the spindle 17, for the bar 20, with the A-key 13 locked to it, to swing inwardly, and thereby close the said A-key 13 at the time the G-sharp or C-sharp key 45 swings into an open position.

On the sleeve 58 for the C-sharp key 45 is secured a lug 62, engaged by an arm 63 held on a sleeve 64, carrying the first, second and third rings 65, 66 and 67 for the first three fingers of the right hand, as plainly indicated in Fig. 1. When the finger-piece 61 is pressed, as previously explained, and the C-sharp key 45 is opened, then this key 45 can be closed on the operator pressing any one of the rings 65, 66 or 67. It is understood that when one of these rings 65, 66 or 67 is pressed, the arm 63 on the sleeve 64 presses the lug 62, so as to impart a turning motion to the sleeve 58, unlocking and making it independent of the sleeve 52, to close the key 45. As soon as the pressure is released on the ring 65, 66 or 67, then the C-sharp key 45 swings back into an open position by the action of its spring 60, and as soon as the finger piece 61 is released, the C-sharp key 45 can close, as previously explained.

The sleeve 64 is mounted to turn loosely on the spindle 53, which is provided at its upper end with an arm 68, pressing a lug 69 on the third ring 35 for the left hand, and on the lower end of the said spindle 53 is arranged an arm 70, extending under the finger-piece 71 for the ordinary G-sharp key (not shown), so that when this finger-piece is pressed, a turning motion is given to the spindle 53 which, by the arm 68, acts on the ring 35, to simultaneously close the G-sharp key 14 and the A-key 13.

From the foregoing it will be seen that the normally open keys 13 and 14 replace the closed A- and G-sharp keys as used on clarinets, as heretofore constructed, and if the clarinet is sounded (open tone) with all the fingers off the various keys and rings, then the tone A is produced.

When the musician presses the finger-piece 61 with the little finger of the left hand, and opens the key 45 for the C-sharp and thereby causes closing of the A-key 13, then the tone G-sharp is produced on sounding the clarinet. When the ring 35 is pressed by the operator and both keys 13 and 14 are closed, then the tone G-natural can be produced.

If the first ring 31 is pressed by the first finger of the left hand, the keys 13 and 14 are also closed and also the valve 31ª, so that when the clarinet is now sounded, the tone F-sharp is produced. The musician, in pressing the ring 32 by the second finger of the left hand, causes a closing of the keys 13 and 14, and when the instrument is now sounded, a passable G-natural that is, one that will answer in rapid passages, is produced. When the finger-piece 42 is pressed and the key 41 for the E-flat is opened, then the keys 13 and 14 are closed with the same result as when the ring 35 is pressed. When the finger-piece 71 for the E-flat key is pressed, the ring 35 is pressed by the action of the arm 68 and lug 69, so that the keys 13 and 14 are simultaneously closed, and when the instrument is now sounded, the tone G-natural is produced. When the thumb-hole key 24 is pressed with the thumb of the left hand, the thumb-hole as well as the keys 13 and 14 are closed, and if the instrument be now sounded it will give F-sharp on clarinets with the old or Albert arrangement of the finger-holes as shown and described, or F-natural on a clarinet of the Boehm type. In case the musician presses the finger-piece 61 with the little finger of the left hand then the A-key 13 is closed, and when the finger-piece 12 of the trilling lever for the B-flat key 1 is pressed by the first or forefinger of the left hand of the musician, then the A-key 13 is opened and with it the B-flat key 1, to allow sounding B-flat. The B-flat trill key having the finger-piece 12 is to be mainly used for correctly and normally shaking A-flat with B-flat, or if the little finger is relieved from the finger-piece 61, the tone A may be correctly and normally shaken with B-flat (see Fig. 21) by trilling the finger-piece 12. When the trill key 30 is pressed the thumb-hole key 24, as well as the keys 13 and 14, are closed, and when the instrument is now sounded, it will give F-sharp on clarinets with the old or Albert arrangement of the finger-holes, or F-natural on a clarinet of the Boehm type. By now pressing down the finger-piece 61 and alternately pressing and releasing the trill key 30, the tones F-sharp and G-sharp (see Fig. 22) are produced. In making this shake, the little finger of the left hand keeps the finger-piece 61 pressed down, as just described.

The clarinet is also provided with the other keys usually found on clarinets, but as such keys do not form part of my invention, they have been omitted from the drawings and description.

Having thus described my invention, I claim as new and desire to secure by Letters Patent:

1. A clarinet having a body, a normally open A-key and a normally open G-sharp key at the front of the said body, a thumb hole at the back of the body, a thumb hole key normally open over the said thumb hole, a connection between the said thumb-hole key and the said G-sharp key, and a connection between the said G-sharp key and the said A-key to close both the said A-key and the said G-sharp key on pressing the said thumb hole key.

2. A clarinet having a body, a normally open A-key, a normally open G-sharp key, an arm thereon a thumb hole at the back of the said body, a thumb hole key normally open over the said thumb hole, an arm on the said thumb hole key and extending under the said arm on the said G-sharp key to close the latter on pressing the thumb hole key, and a connection between the said G-sharp key and the said A-key to close the latter on closing the said G-sharp key.

3. A clarinet having a normally closed B-flat key having a finger piece in position to be pressed by the thumb of the left hand, and a trilling lever having a finger piece in position to be pressed by the forefinger of the left hand, and an arm on the said trilling lever engaging the said B-flat key for opening the same on pressing the finger piece of the trilling lever.

4. A clarinet having a normally open A-key, a normally closed C-sharp key, and an operating part common to both keys to close the A-key on opening the C-sharp key.

5. A clarinet having a normally open A-key, a normally open G-sharp key, means for closing the said A-key on closing the said G-sharp key, a ring in position to be pressed by the third finger of the left hand, and a connection between the said ring and the said G-sharp key to close the same simultaneously and thereby the A-key on pressing the said ring.

6. A clarinet having a normally open A-key, a normally open G-sharp key, means for closing the said A-key on closing the said G-sharp key, a ring in position to be pressed by the second finger of the left hand, and a connection between the said G-sharp key and the said ring, to close both keys simultaneously on pressing the ring.

7. A clarinet having a normally open A-key, a normally open G-sharp key, means for closing the said A-key on closing the said G-sharp key, a ring in position to be pressed by the first finger of the left hand, and a connection between the said G-sharp key and the said ring, to close the keys simultaneously on pressing the ring.

8. A clarinet having normally open A and G-sharp keys, a normally closed E-flat key, and a connection between the open keys and the closed key, to close simultaneously the normally open keys on opening the normally closed key.

9. A clarinet having a normally open A-key, a normally open G-sharp key, a ring normally raised in position to be pressed by the third finger of the left hand, a connection between this ring and the said normally open keys for closing the latter, an E-flat key in position to be pressed by the little finger of the right hand, and a connection between the E-flat key and the said ring, for actuating the said ring, the first-named connection the said A-key and G-sharp key, to close the A-key and G-sharp key.

10. A clarinet having a normally open A-key, means for closing the said A-key, a normally closed B-flat key, and a trill-lever in position to be played by the forefinger of the left hand and connected with the said keys, for simultaneously opening the same when both are closed.

11. A clarinet having a normally open A-key, a normally open G-sharp key, a thumb-hole at the back of the clarinet, a thumb-hole key normally open over the said thumb-hole, and a connection between the said keys, to close the said A-key and the said G-sharp key on closing the said left thumb-hole key.

12. A clarinet having a normally closed C-sharp key provided with a sleeve, a lug on the said sleeve, a second sleeve having a lug, a spring attached to the said lug of the second sleeve and engaging the lug of the said key-sleeve, to hold the sleeves in engagement with each other, a spindle on which the sleeves are mounted to turn, and means for turning the said second sleeve and with it the first sleeve, to open the said C-sharp key.

13. A clarinet having a normally closed C-sharp key, provided with a sleeve, a lug on the said sleeve, a second sleeve having a lug, a spring attached to the said lug of the second sleeve and engaging the lug of the said key-sleeve, to hold the said sleeves in engagement with each other, a spindle on which the sleeves are mounted to turn, means for turning the said second sleeve and with it the first sleeve, to open the said C-sharp key, and a second spring pressing the said second sleeve, to normally hold the C-sharp key closed.

14. A clarinet having a normally closed C-sharp key provided with a sleeve, a lug on the said sleeve, a second sleeve having a lug, a spring attached to the said lug of the second sleeve and engaging the lug of the said key-sleeve, to hold the sleeves in engagement with each other, a spindle on which the sleeves are mounted to turn, a second spring pressing the said second sleeve, to normally hold the C-sharp key closed, a finger-piece having its hub mounted to turn independently of the said sleeves, a lug on the said hub, and a lug on the said second sleeve, engaged by the finger piece hub, to turn the said second sleeve and with it the said key-sleeve, to open the C-sharp key.

In testimony whereof I have signed my name to this specification in the presence of two subscribing witnesses.

HENRY BONN, Jr.

Witnesses:
 WILLIAM WIRTH,
 WILLIAM ROBERT WILLIAMS.